US012696174B2

(12) United States Patent
Kim

(10) Patent No.: US 12,696,174 B2
(45) Date of Patent: Jul. 28, 2026

(54) COMMUNICATION RELATED TO NETWORK SLICE

(71) Applicant: LG ELECTRONICS INC., Seoul (KR)

(72) Inventor: Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 570 days.

(21) Appl. No.: 17/912,473

(22) PCT Filed: Mar. 15, 2021

(86) PCT No.: PCT/KR2021/003147
§ 371 (c)(1),
(2) Date: Sep. 16, 2022

(87) PCT Pub. No.: WO2021/187829
PCT Pub. Date: Sep. 23, 2021

(65) Prior Publication Data
US 2023/0164668 A1 May 25, 2023

(30) Foreign Application Priority Data

Mar. 17, 2020 (KR) ........................ 10-2020-0032757

(51) Int. Cl.
H04W 48/06 (2009.01)
H04W 48/14 (2009.01)
H04W 60/00 (2009.01)
(52) U.S. Cl.
CPC .......... H04W 48/06 (2013.01); H04W 48/14 (2013.01); H04W 60/00 (2013.01)

(58) Field of Classification Search
CPC ...... H04W 48/18; H04W 48/14; H04W 60/00
See application file for complete search history.

(56) References Cited

U.S. PATENT DOCUMENTS

| | | | | |
|---|---|---|---|---|
| 2018/0227871 A1* | 8/2018 | Singh | .................... | H04W 48/18 |
| 2019/0029065 A1* | 1/2019 | Park | ..................... | H04W 60/00 |

(Continued)

FOREIGN PATENT DOCUMENTS

| | | |
|---|---|---|
| EP | 4109975 A1 | 12/2022 |
| KR | 10-2018-0047172 A | 5/2018 |

(Continued)

OTHER PUBLICATIONS

3GPP Standard, "3rd Generation Partnership Project; Technical Specification Group Services and System Aspects; Study on Enhancement of Network Slicing Phase 2 (Release 17)", 3GPP TR 23.700-40 V0.3.0, Jan. 30, 2020.

(Continued)

*Primary Examiner* — Jackie Zuniga Abad
(74) *Attorney, Agent, or Firm* — BRYAN CAVE LEIGHTON PAISNER LLP

(57) ABSTRACT

A disclosure of the present specification provides a method for performing communication related to a network slice by an AMF node. The method may comprise the steps of: receiving a first registration request message from a UE; determining whether the UE can access a first network slice, on the basis of a quota applied to the first network slice; and transmitting a response message to the UE.

12 Claims, 15 Drawing Sheets

(56)        References Cited

U.S. PATENT DOCUMENTS

| | | | |
|---|---|---|---|
| 2020/0169921 A1 | 5/2020 | Zhu et al. | |
| 2020/0229079 A1* | 7/2020 | Lee ...................... | H04W 48/02 |
| 2021/0168705 A1* | 6/2021 | Fiorese .............. | H04W 12/037 |
| 2021/0235372 A1* | 7/2021 | Wang ................... | H04W 24/02 |
| 2022/0369204 A1* | 11/2022 | Jeong ................... | H04W 28/10 |

FOREIGN PATENT DOCUMENTS

| | | |
|---|---|---|
| KR | 10-2019-0018707 A | 2/2019 |
| KR | 10-2020-0003195 A | 1/2020 |
| WO | 2019/024604 A1 | 2/2019 |

OTHER PUBLICATIONS

Motorola Mobility et al., "Solution to KI#1, KI#2 and KI#4 on monitoring multiple quotas of network slice attributes at NWDAF", S2-2001651, SA WG2 Meeting #S2-136AH, Incheon, South Korea, Jan. 13-17, 2020, see sections 6.X.1 and 6.X.3.1.
Apple et al., "Solution for Key Issue #2: Deactivated PDU Session release for efficient PDU Session quota management", S2-2001477, SA WG2 Meeting #136-AH, Incheon, Seoul, Jan. 13-17, 2020, see section 6.X.3.1; and figure 6.X.3.1-2.

* cited by examiner

Figure 2:
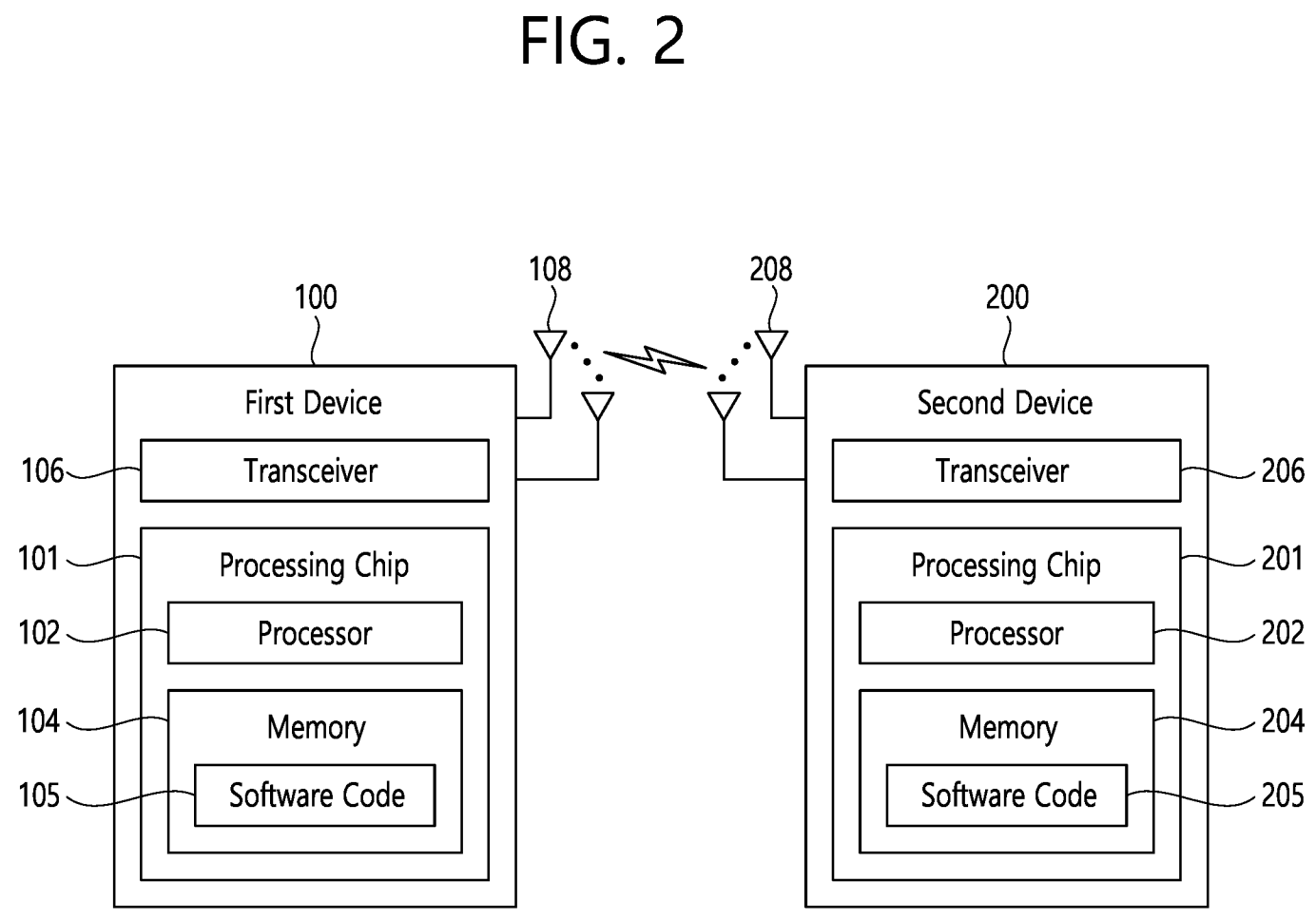

Second Device 200

- Transceiver 206
- Processing Chip 201
  - Processor 202
  - Memory 204
    - Software Code 205

208

First Device 100

108

- Transceiver 106
- Processing Chip 101
  - Processor 102
  - Memory 104
    - Software Code 105

FIG. 3

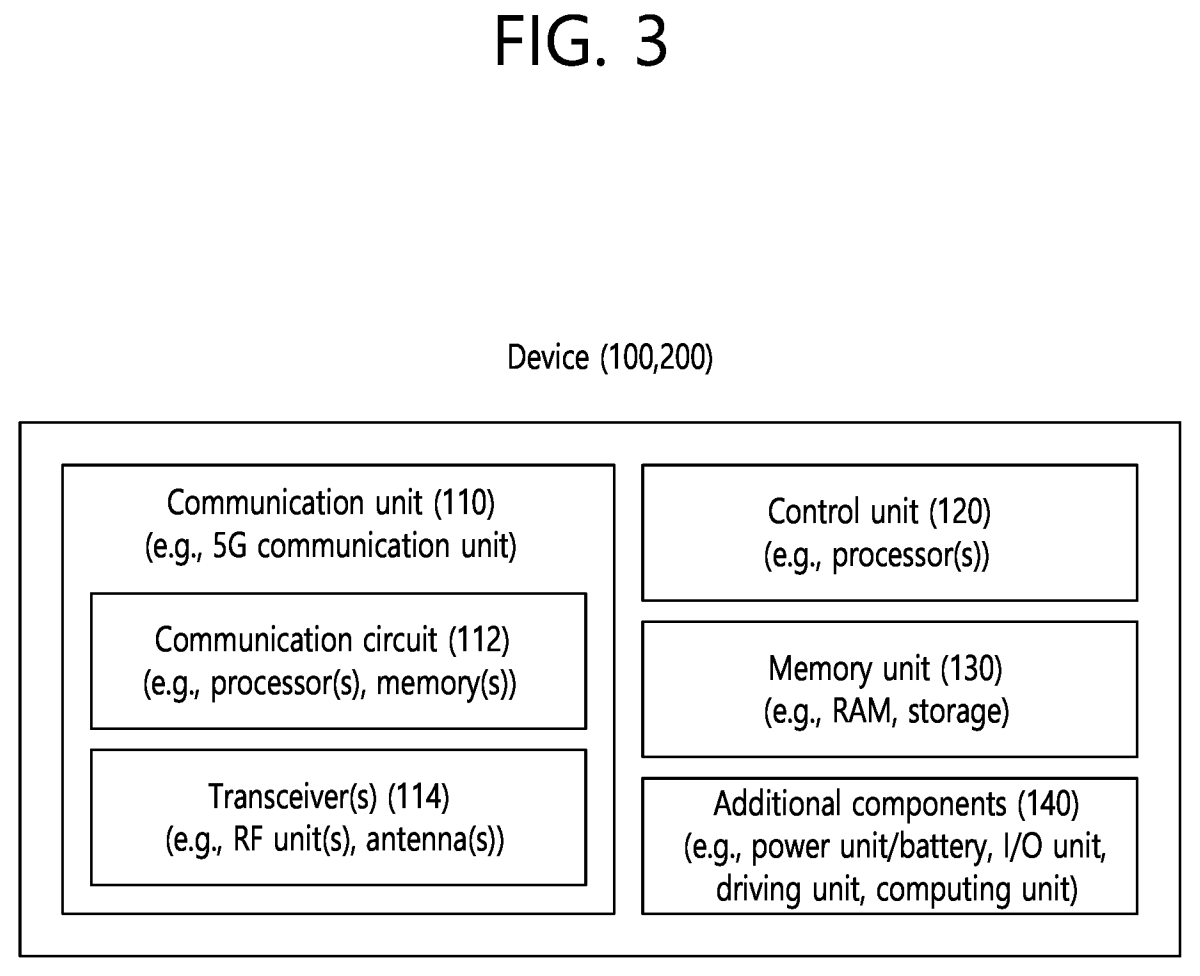

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 6

COMMUNICATION RELATED TO NETWORK SLICE

This application is the National Stage filing under 35 U.S.C. 371 of International Application No. PCT/KR2021/ 003147, filed on Mar. 15, 2021, which claims the benefit of and priority to Korean Application No. 10-2020-0032757, filed on Mar. 17, 2020, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, communication based on network slices has been introduced. A specific network slice may not be able to serve a UE due to various issues (eg, overload of network slices, limitation of the number of serving UEs/number of PDU sessions according to slice management policy, etc.). In this case, the network may transmit a rejection message to the terminal.

However, the conventional method in which a rejection message is transmitted to the terminal in a batch when the network slice cannot serve the terminal has a problem in that efficient communication is impossible. For example, in terms of the position of the terminal and/or the service received by the terminal, consideration of the requested service of the terminal or the will/preference of the terminal user is insufficient. Due to this, flexibility in the provision of various 5G industries/services may be reduced.

For example, regardless of the situation (Example: When network resources are insufficient, when the terminal cannot access the network slice due to policy, when 3rd party authentication is required, etc.) in which the network slice cannot serve the terminal, a rejection message is collectively transmitted to the terminal. For this reason, there is a problem that efficient communication is impossible.

For example, even when the terminal cannot access the network slice due to a quota applied to the network slice, since a rejection message is unconditionally transmitted to the terminal, flexibility in providing a service to the terminal may be reduced. In addition, even if the network slice cannot be accessed, the terminal may need to communicate with the network including the corresponding network slice, but since only a rejection message is transmitted conventionally, the terminal and the network could not communicate.

SUMMARY

Accordingly, a disclosure of the present specification has been made in an effort to solve the aforementioned problem.

One disclosure of the present specification provides a method for an AMF node to perform communication related to a network slice. The method includes receiving a first registration request message from the UE; determining whether the UE can access the first network slice based on a quota applied to the first network slice; and transmitting a response message to the UE.

In order to solve the above problems, one disclosure of the present specification provides a method for a UE to perform network slice-related communication. The method includes sending a first registration request message to an Access and Mobility Management Function (AMF) node, the first registration request message including information on a first network slice to which the UE intends to access; and receiving a response message from the AMF node.

In order to solve the above problems, one disclosure of the present specification provides an AMF node that performs communication related to a network slice. The AMF node includes at least one processor; and at least one memory for storing instructions and operably electrically connectable with the at least one processor, wherein the operations performed based on the instructions being executed by the at least one processor include: receiving a first registration request message; determining whether the UE can access the first network slice based on a quota applied to the first network slice; and transmitting a response message to the UE.

In order to solve the above problems, one disclosure of the present specification provides a UE that performs network slice related communication. The UE includes at least one processor; and at least one memory for storing instructions and operably electrically connectable with the at least one processor, wherein the operations performed based on the instructions being executed by the at least one processor include: transmitting a first registration request message to an Access and Mobility Management Function (AMF) node, wherein the first registration request message includes information on a first network slice to which the UE intends to access; and receiving a response message from the AMF node.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: identifying a first registration request message received from the UE; determining whether the UE can access the first network slice based on a quota applied to the first network slice; and generating a response message.

In order to solve the above problems, one disclosure of the present specification provides a non-volatile computer-readable storage medium in which instructions are recorded. The instructions, when executed by one or more processors, cause the one or more processors to: identifying a first registration request message received from a UE; determining whether the UE can access the first network slice based on a quota applied to the first network slice; and generating a response message.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 1 shows an example of a communication system to which implementations of the present disclosure is applied.

FIG. 2 shows an example of a wireless device to which implementations of the present disclosure is applied.

FIG. 3 shows an example of a wireless device to which implementations of the present disclosure is applied.

FIG. 6 is an exemplary diagram illustrating an architecture that allows the UE to simultaneously access two data networks using one PDU session.

Figure 4:
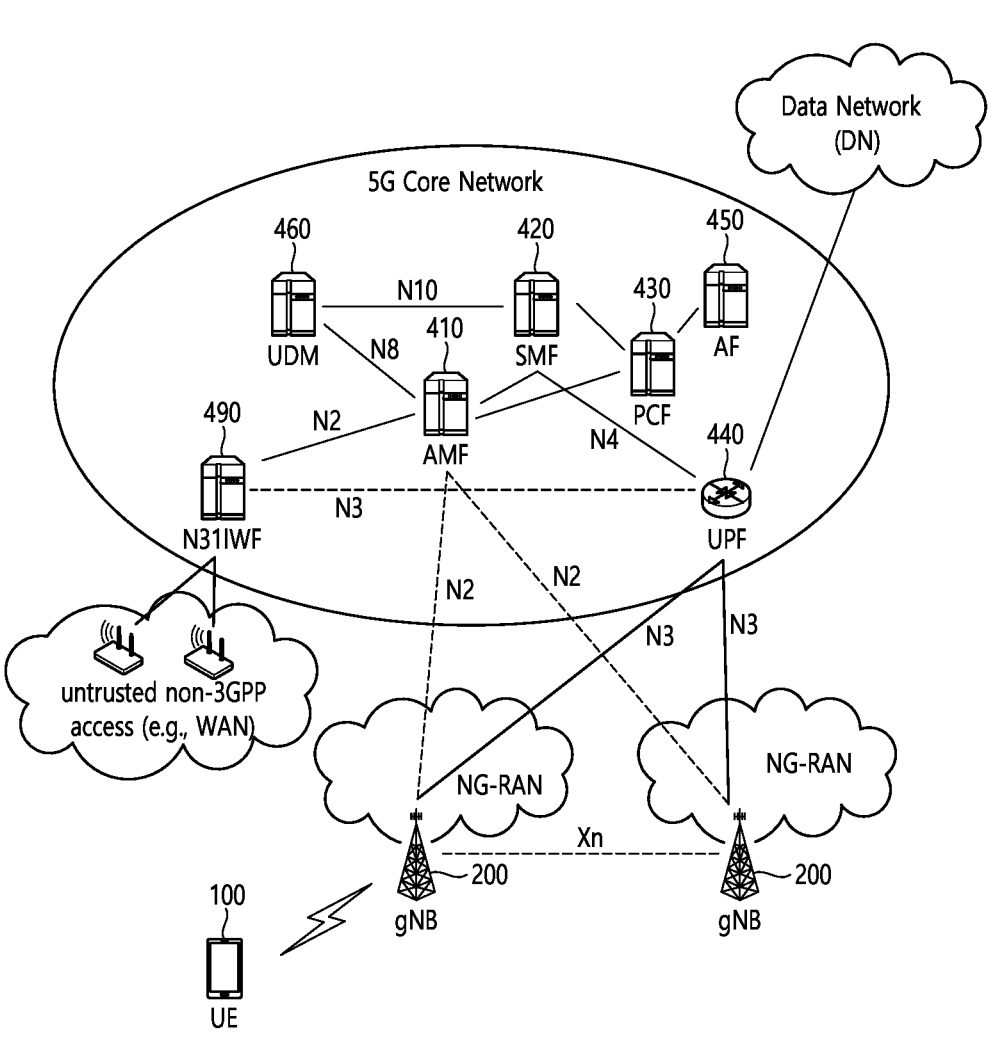
FIG. 4 is a structural diagram of a next-generation mobile communication network.

DESCRIPTION OF EXEMPLARY
EMBODIMENTS

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs 01-DMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

Figure 1:
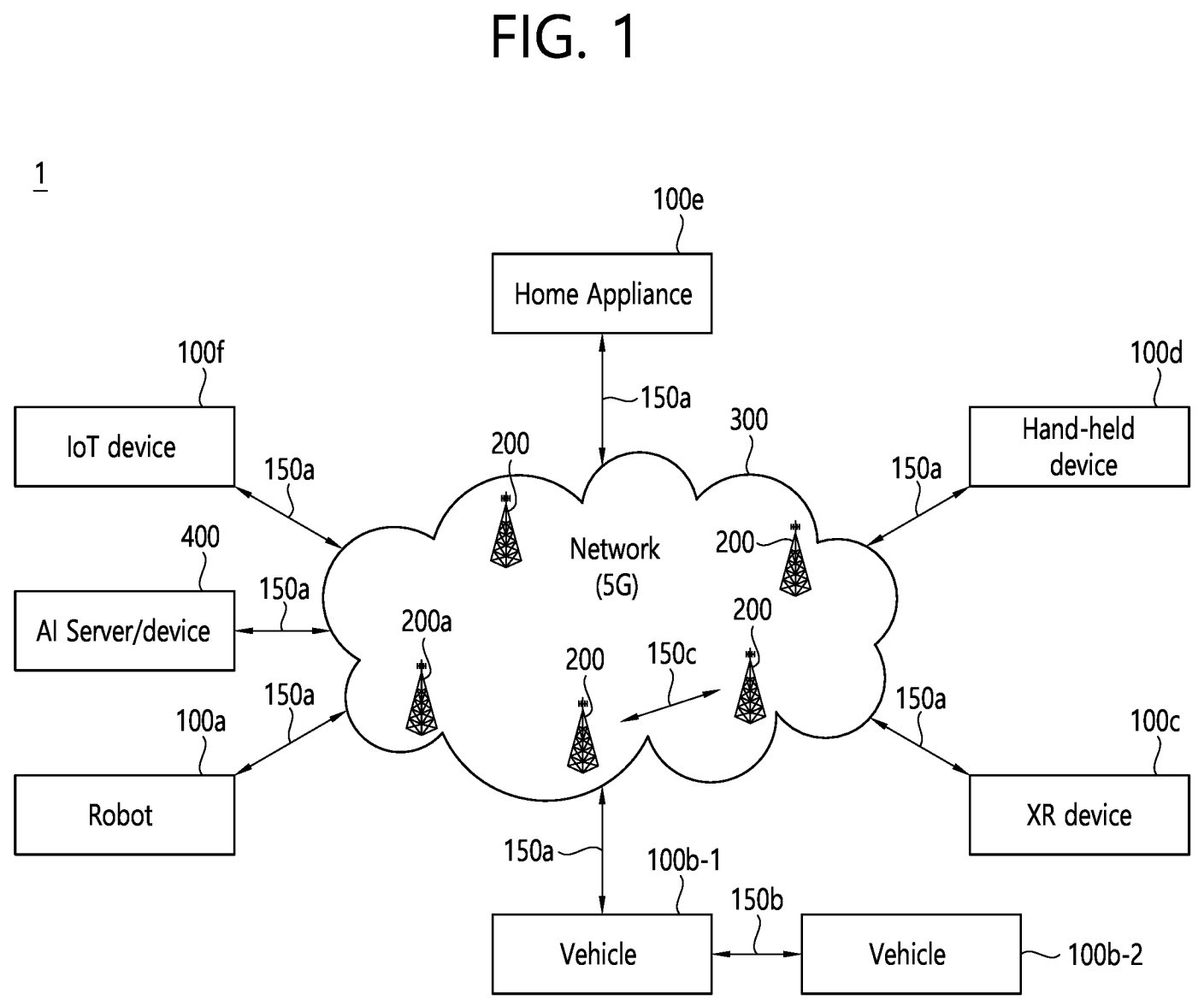

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

For example, the VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

FIG. 4 is a structural diagram of a next-generation mobile communication network.

5GC (5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP (3rd Generation Partnership Project) inter-working function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5$^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

Figure 5:
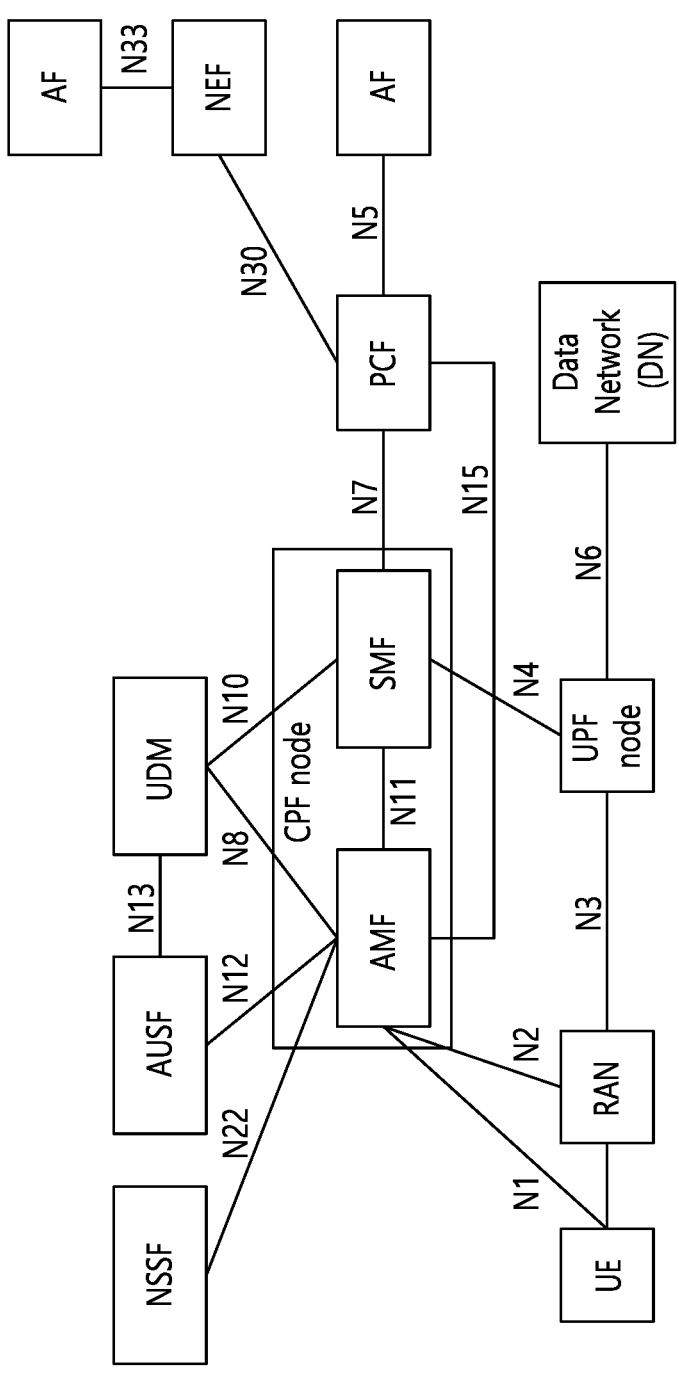
FIG. 5 is an exemplary diagram illustrating a predicted structure of a next generation mobile communication in terms of a node.

FIG. 5 is an exemplary diagram illustrating a predicted structure of a next generation mobile communication in terms of a node.

Referring to FIG. 5, the UE is connected to a data network (DN) through a next generation RAN (Radio Access Network).

The Control Plane Function (CPF) node shown in FIG. 5 may perform all or part of the Mobility Management Entity (MME) function of the fourth generation mobile communication, and all or a part of the control plane function of the Serving Gateway (S-GW) and the PDN (Packet Data Network)-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 5 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 6:
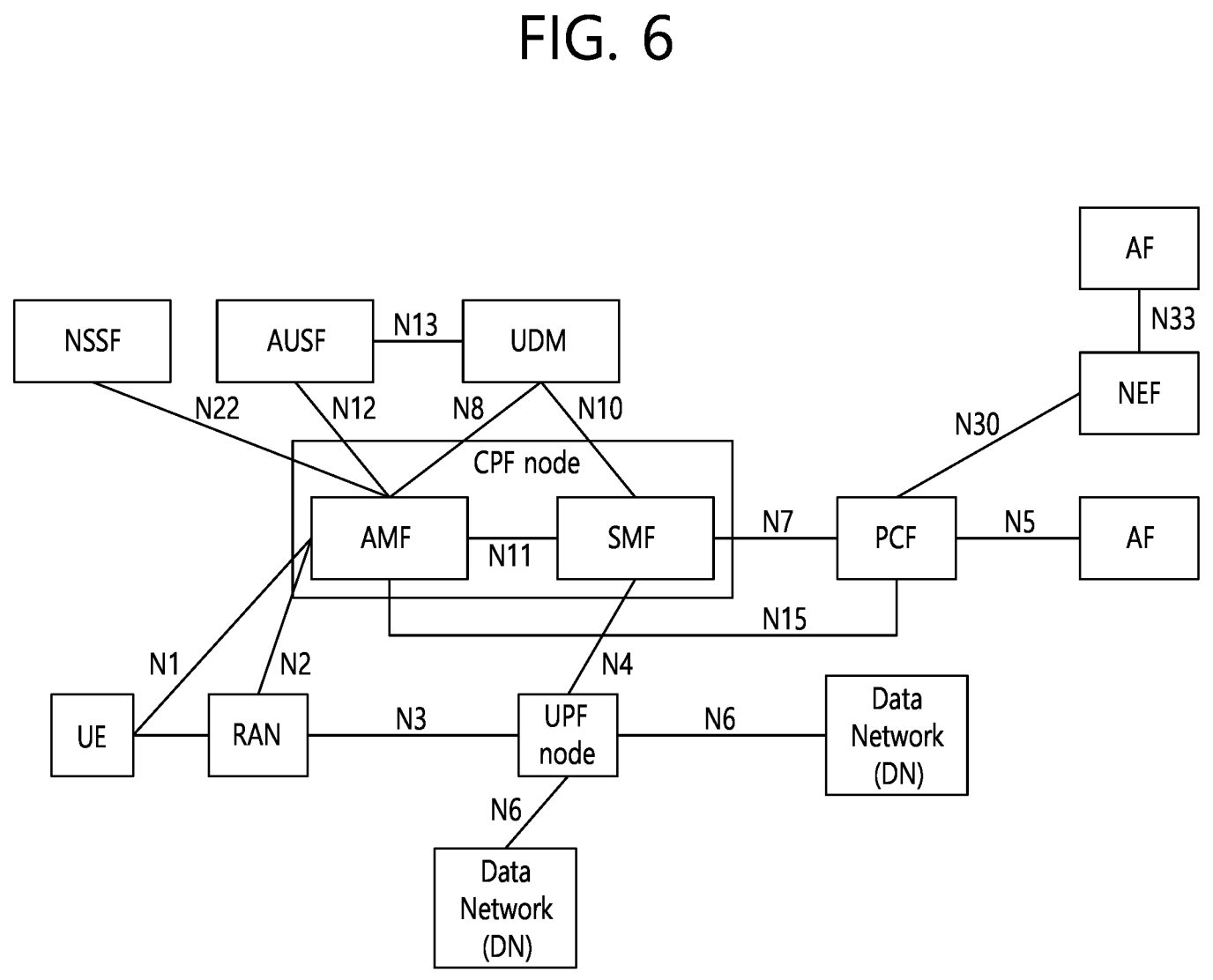

In FIG. 6, the UE may simultaneously access two data networks using multiple PDU sessions.

FIG. 6 is an exemplary diagram illustrating an architecture that allows the UE to simultaneously access two data networks using one PDU session.

FIG. 6 illustrates an architecture that allows the UE to simultaneously access two data networks using one PDU session.

For reference, descriptions of the reference points shown in FIGS. 2 and 3 are as follows.

N1 represents Reference point between UE and AMF.

N2 represents Reference point between NG-RAN and AMF.

N3 represents Reference point between NG-RAN and UPF.

N4 represents Reference point between SMF and UPF.

N5 represents Reference point between PCF and AF.

N6 represents Reference point between UPF and DN.

N7 represents Reference point between SMF and PCF.

N8 represents Reference point between UDM and AMF.

N9 represents Reference point between UPFs.

N10 represents Reference point between UDM and SMF.

N11 represents Reference point between AMF and SMF.

N12 represents Reference point between AMF and AUSF.

N13 represents Reference point between UDM and AUSF.

N14 represents Reference point between AMFs.

N15 represents Reference point between PCF and AMF in a non-roaming scenario and reference point between AMF and PCF of visited network in roaming scenario.

N16 represents Reference point between SMFs.

N22 represents Reference point between AMF and NSSF.

N30 represents Reference point between PCF and NEF.

N33 represents Reference point between AF and NEF.

In FIGS. 5 and 6, AF by a third party other than an operator may be connected to 5GC through a network exposure function (NEF).

<Registration Procedure>

The UE needs to obtain an authorization to enable mobility tracking and to receive data, and to receive services. For this, the UE must register with the network. The registration procedure is performed when the UE needs to do initial registration with the 5G system. In addition, the registration procedure is performed when the UE performs periodic registration update, when the UE is in an idle mode and moving to a new tracking area (TA), and when the UE needs to perform periodic registration update.

During the initial registration procedure, the ID of the UE may be obtained from the UE. AMF may pass PEI (IMEISV) to UDM, SMF and PCF.

Figure 7A:
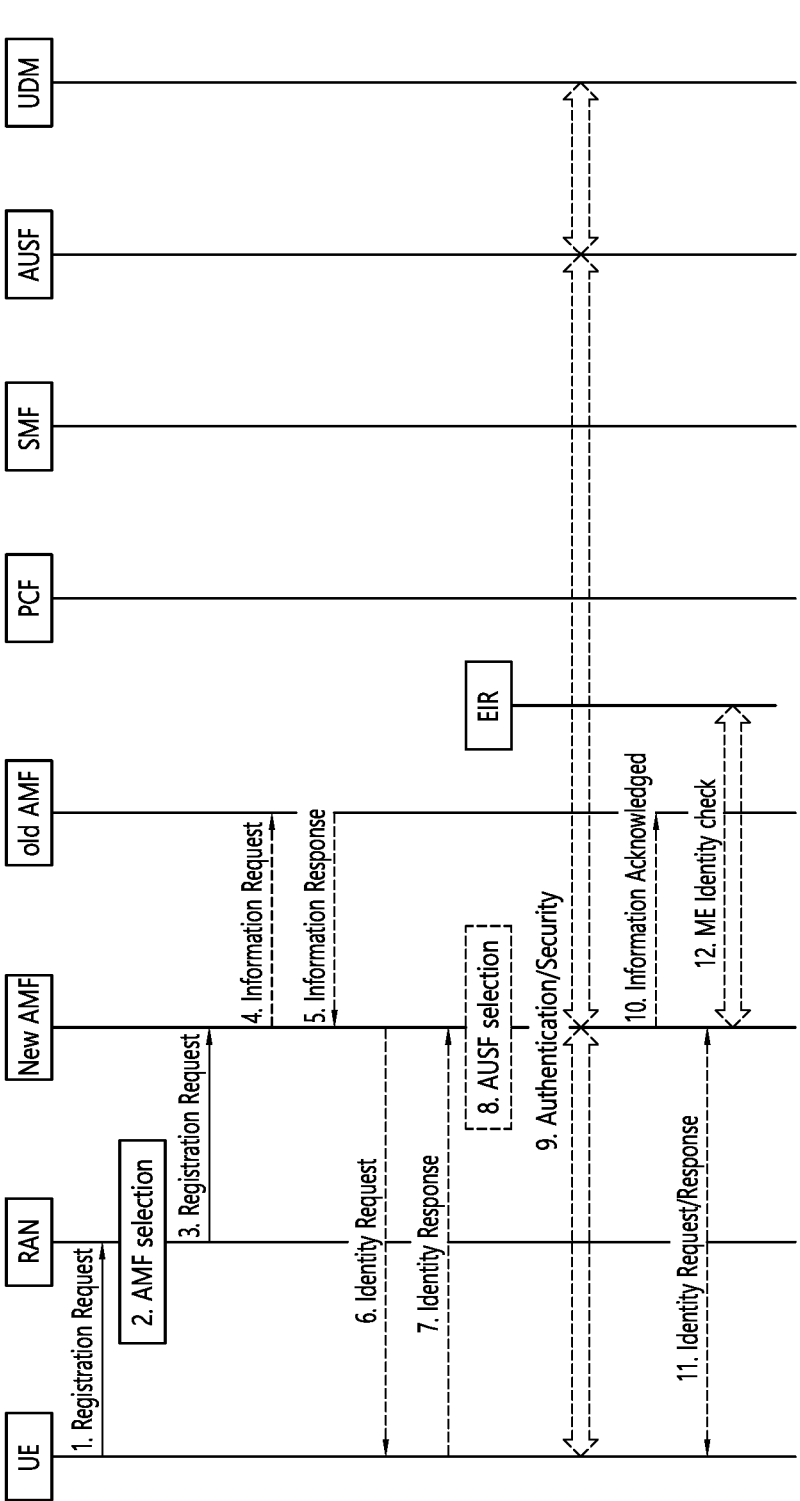
FIGS. 7a and 7b are signal flow charts showing an exemplary registration procedure.
Figure 7B:
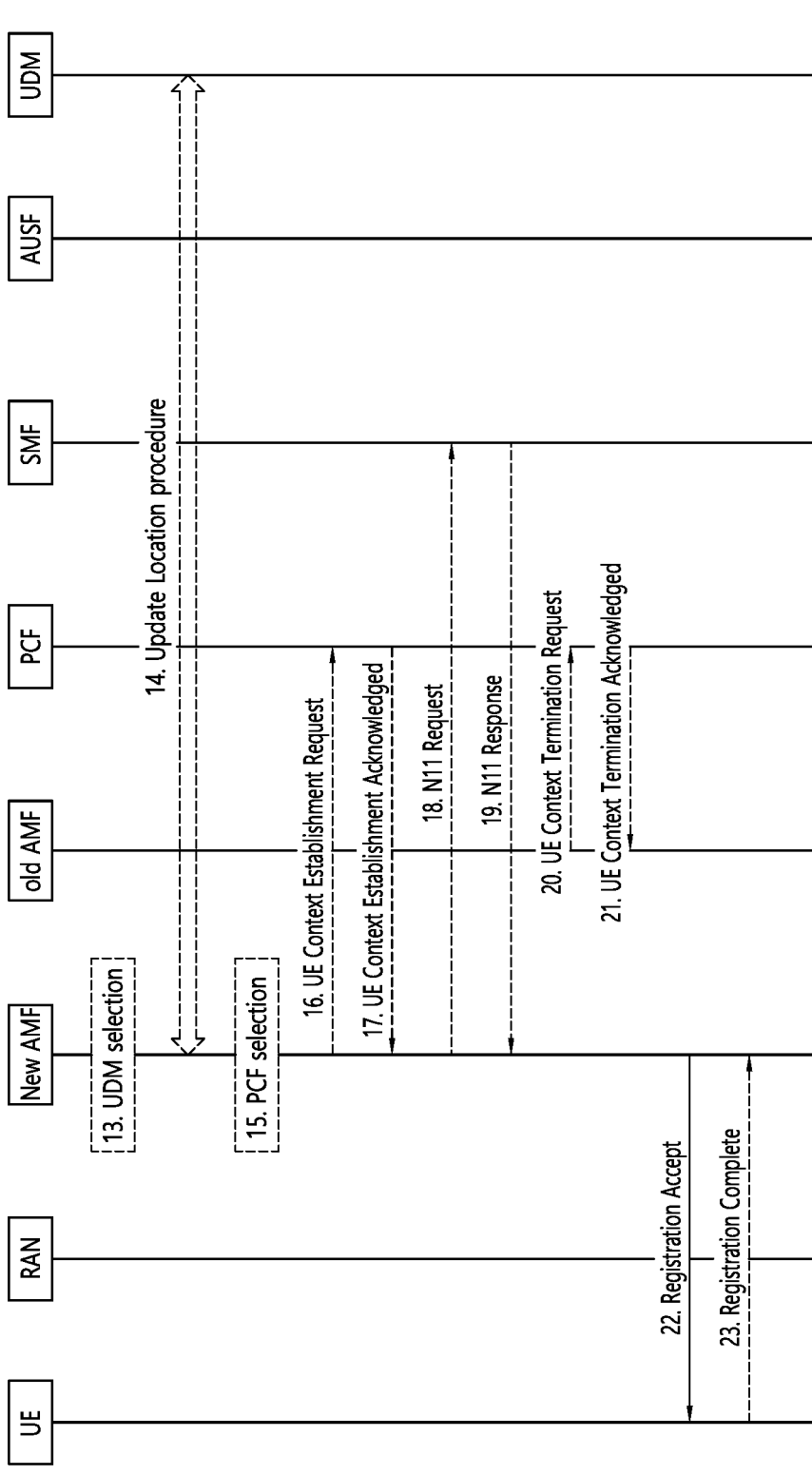

FIGS. 7a and 7b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN (Public Land Mobile Network) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Network Slice>

Hereinafter, network slicing to be introduced in next-generation mobile communication will be described.

Next-generation mobile communication introduces the concept of network slicing in order to provide various services through one network. Here, the network slicing is a combination of network nodes having functions necessary to provide a specific service. A network node constituting a slice instance may be a hardware independent node or a logically independent node.

Each slice instance may be composed of a combination of all nodes necessary to configure the entire network. In this case, one slice instance may independently provide a service to the UE.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the Core Network (CN) node and the RAN can be separated. In addition, a slice instance is different from a dedicated core network in that network nodes can simply be logically separated.

For reference, for a network slice, quota may be used.

For example, a quota related to a network slice may include a quota for the maximum number of UEs. The quota for the maximum number of UEs may mean the maximum number of terminals that can use a network slice at the same time. As an example, each network slice information may include quota information for the maximum number of UEs (eg, 10 pieces, 1000000 pieces, etc.).

For example, a quota related to a network slice may include a quota for the maximum number of PDU sessions. The quota for the maximum number of PDU sessions may mean the maximum number of concurrent PDU sessions supported in the network slice. For example, the maximum number of concurrent (concurrent) PDU sessions supported in a network slice may mean the maximum number of PDU sessions established at the same time in one network slice related to a DNN (Data Network Name) defined by S-NS-SAI.

In 5G mobile communication, network slice quota event notification may be supported in the network slice. For example, event notification about a quota related to a network slice may be supported. For example, an AF may request an event notification about a quota related to a network slice in 5GS. Then, AF may be notified of quota for attributes related to network slices in 5GS. For example, 5GS may inform the AF whether the quota for a particular attribute has reached a specified threshold. AF may then influence the 5GS routing decision.

Figure 8:
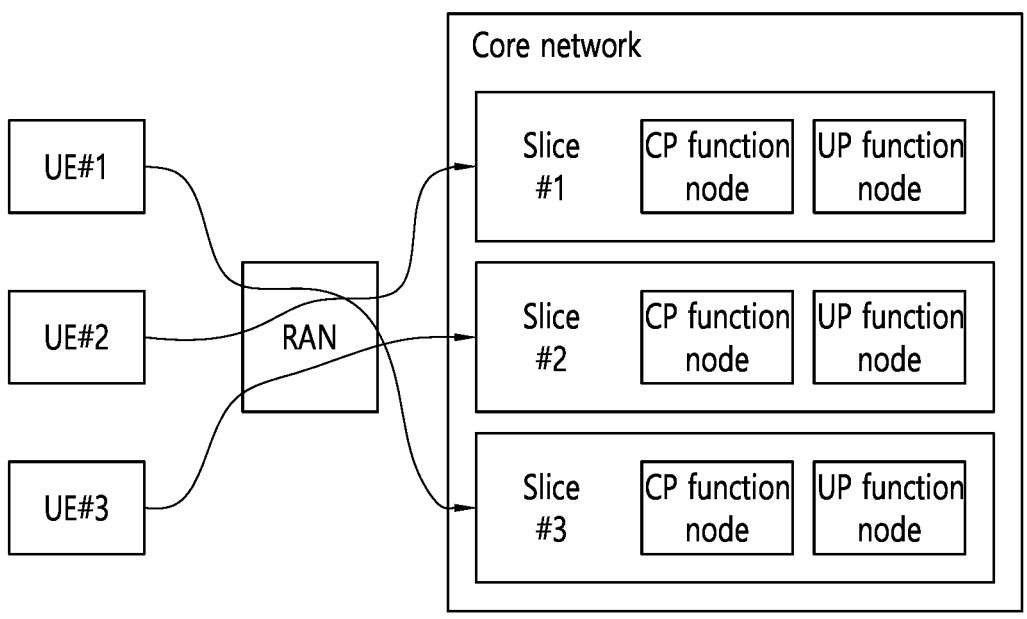
FIG. 8 is an exemplary diagram illustrating an example of an architecture for implementing the concept of network slicing.

FIG. 8 is an Exemplary Diagram Illustrating an Example of an Architecture for Implementing the Concept of Network Slicing.

As can be seen with reference to FIG. 8, the Core Network (CN) may be divided into several slice instances. Each slice instance may include one or more of a CP function node and a UP function node.

Each UE may use a network slice instance suitable for its own service through the RAN.

Unlike shown in FIG. 8, each slice instance may share one or more of a CP function node and a UP function node with another slice instance. This will be described with reference to FIG. 9 as follows.

Figure 9:
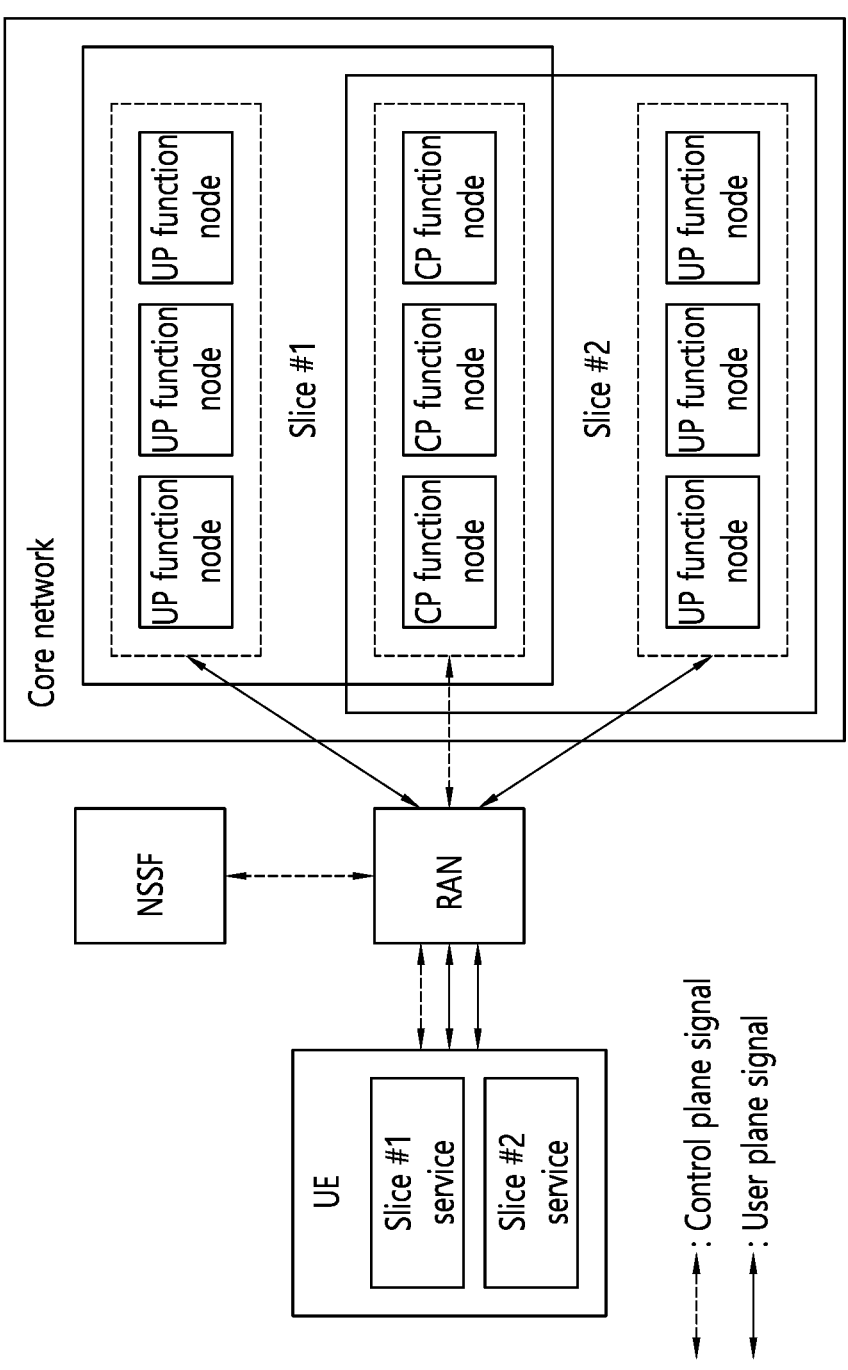
FIG. 9 is an exemplary diagram illustrating another example of an architecture for implementing the concept of network slicing.

FIG. 9 is an Exemplary Diagram Illustrating Another Example of an Architecture for Implementing the Concept of Network Slicing.

Referring to FIG. 9, a plurality of UP functional nodes is clustered, and similarly, a plurality of CP functional nodes is also clustered.

And, referring to FIG. 9, slice instance #1 (or referred to as instance #1) in the core network includes the first cluster of UP functional nodes. And, the slice instance #1 shares a cluster of CP functional nodes with slice #2 (or referred to as instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

II. Problems to be Solved by the Disclosure of the Present Specification

In a mobile communication system to which network slicing is applied, a specific network slice may not be able to serve a terminal due to various issues (e.g., overload of network slices, limitation of the number of serving terminals/number of PDU sessions according to slice management policy, etc.). In this case, the network may transmit a rejection message to the terminal. In this case, the network may transmit information such as a back-off timer to the terminal together with a rejection message in order to limit the re-request of the terminal. When the network transmits a rejection message to a plurality of terminals, by distributing back-off time values for each of the plurality of terminals, a technique of distributing the requests of the terminals from the point of view of the entire network may be used.

An example in which the network transmits a rejection message when the network slice fails to serve the UE will be described with reference to the examples of FIGS. 10*a* and 10*b*.

Figure 10A:
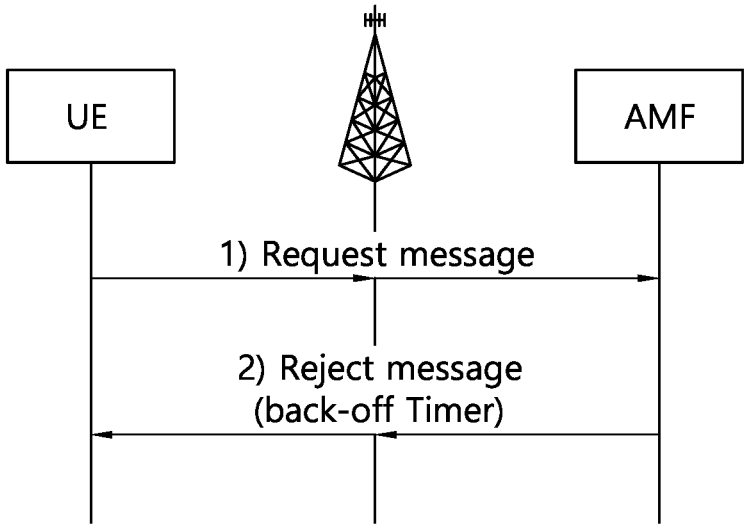
FIGS. 10a and 10b show examples of operations performed by the network when the network slice fails to serve the UE.
Figure 10B:
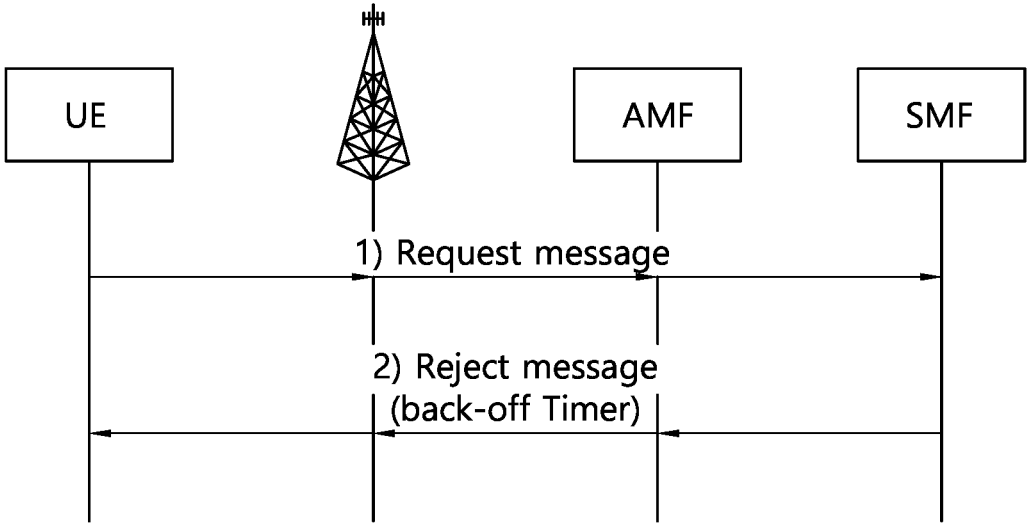

FIGS. 10*a* and 10*b* Show Examples of Operations Performed by the Network when the Network Slice Fails to Serve the UE.

Referring to FIG. 10*a*, a UE, a base station (an object shown between the UE and the AMF), and an AMF are illustrated.

1) The UE may send a request message to the network. For example, the UE may send a registration request message to the AMF.

2) A network slice serving the UE may not serve the UE for a specific reason (eg, overload of network slices, limiting the number of serving terminals/number of PDU sessions according to slice management policy, etc.). In this case, the AMF may transmit a rejection message for rejecting the request message to the UE. Here, the AMF may include information on the back-off timer in the rejection message to prevent the UE from immediately retransmitting the request message for the same network slice.

Referring to FIG. 10*b*, a UE, a base station (an object shown between the UE and the AMF), an AMF, and an SMF are illustrated.

1) The UE may send a request message to the network. For example, the UE may transmit a PDU session establishment request message to the AMF.

2) A network slice serving the UE may not serve the UE for a specific reason (eg, overload of network slices, limiting the number of serving terminals/number of PDU sessions according to slice management policy, etc.). In this case, the SMF may transmit a rejection message rejecting the request message to the UE. Here, the SMF may include information on the back-off timer in the rejection message to prevent the UE from immediately retransmitting the request message for the same network slice.

However, the conventional method in which a rejection message is transmitted collectively to the terminal when the network slice cannot serve the terminal has a problem in that efficient communication is impossible. For example, in terms of the position of the terminal and/or the service received by the terminal, consideration of the requested service of the terminal or the will/preference of the terminal user is insufficient. Due to this, flexibility in the provision of various 5G industries/services may be reduced.

For example, regardless of the situation (Example: When network resources are insufficient, when the terminal cannot access the network slice due to policy, when 3rd party authentication is required, etc.) in which the network slice cannot serve the terminal, a rejection message is collectively transmitted to the terminal. For this reason, there is a problem that efficient communication is impossible.

For example, even when a network slice is temporarily unavailable, etc, since the rejection message is unconditionally transmitted to the terminal, flexibility in providing a service to the terminal may be reduced. In addition, even if the terminal cannot access the network slice, it may be necessary for the terminal to communicate with the network including the corresponding network slice, conventionally, since only a rejection message is transmitted, the terminal and the network cannot communicate.

III. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

A description of a method for performing communication related to a network slice proposed in the disclosure of the present specification may consist of a combination of one or more operations/configurations/steps described below. The following methods described below may be performed or used in combination or complementary.

In this specification, the following methods are proposed to solve the problem. The methods below may be performed or used in combination or complementary.

As described in the disclosure of the present specification, the network node may perform an operation as illustrated in the following example. For example, the network node performing the operation described in the example below may be an AMF. A network node may be described as a network control node.

A network node (eg, AMF) may exchange information with a network slice quota management node according to an access request from a terminal. In addition, the network node may determine whether the terminal can access a specific network slice. Here, the network slice quota management node may be, for example, a new network node (eg, New NF (Network Function)) that manages the network slice quota. Alternatively, the network slice quota management node may be, for example, Network Data Analytics Function (NWDAF), or NSSF.

The network node (eg, AMF) may transmit a response message (eg, an access request response message in response to the terminal's access request) to the terminal after determining whether the terminal can access a specific network slice. The network node (eg, AMF) may transmit a response message (eg, an access request response message in response to the terminal's access request) to the terminal together with one or more of the following examples of information:

Permission candidate network slice information; and/or

Information indicating directly or indirectly that the update of information related to the network slice (eg, the network slice requested by the UE) has occurred in relation to the network slice quota.

Here, the permission candidate network slice may be defined as in the following example. Due to the limitation of the network slice quota, a network node (eg, AMF) may not allow the terminal access to a specific network slice to which the terminal wants to access. In this case, a specific network slice may be defined as a permission candidate network slice. In other words, in addition to the network slice permission procedure confirmed in the prior art, such as subscriber information, the grant candidate network slice may mean a network slice in the case where a network node (eg, AMF) cannot permit access of a UE due to quota restrictions.

Here, a case in which it is determined that the terminal cannot be accessed due to the limitation of the network slice quota, may mean a case in which there is no problem in the factors, other than Network Slice Quota, that determine the terminal's access to the network (eg, terminal authentication, network slice subscription information, etc.), so network access can be permitted, but access is impossible due to the limitation of the network slice quota. For example, the limit of the network slice quota may mean a limit according to the maximum number of terminals that can access the network slice, the maximum number of PDU sessions that can be established in the network slice, the maximum downlink data rate or the maximum uplink data rate that can be used in the network slice, etc. For this permission candidate network slice, the terminal cannot receive a normal service, but the terminal and the network may send and receive control messages.

As described in the disclosure of the present specification, a terminal (eg, UE) may perform an operation as illustrated in the following example.

The terminal may transmit an access request message (eg, a registration request message) to a network control node (eg, AMF). When the terminal transmits the access request message to the network control node (eg, AMF), it may transmit one or more of the following examples of information together:

Information on whether the terminal supports the network slice quota-related function or whether the network slice quota-related function is activated; and/or Information requesting re-evaluation of the permission of the network slice related to the network slice quota (eg, information such as a change in the charging of the terminal).

Here, the network slice quota related function of the UE may include a function for the UE to understand quota related information (eg, quota related rejection reason, candidate network slice related information, etc.) received from the network. In addition, the network slice quota-related function of the terminal includes a function that can identify the user's input, such as paying an additional fee (or charging), or a function to transmit a message including the information to the network, in order for the terminal to re-evaluate the permission of the network slice related to Qouta. Since all UEs may not support the network slice quota related function, the network slice quota related function may be selectively supported by some UEs. Alternatively, the network slice quota related function may be selectively activated by some terminals. Activation of such a function may be set in the terminal in advance, and may be determined according to whether the user's setting is changed or the operator's policy update, and the like.

Hereinafter, a specific example of communication related to a network slice will be described with reference to the first example and the second example of the disclosure of the present specification. For reference, the operations described in the first example of the disclosure of the present specification and the operations described in the second example of the disclosure of the present specification may be performed independently of each other. In addition, the operations described in the first example of the disclosure of the present specification and the operations described in the second example of the disclosure of the present specification may be performed in combination with each other.

1. First Example of the Disclosure of the Present Specification

Hereinafter, a first example of the disclosure of the present specification will be specifically described with reference to FIG. 11.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 11:
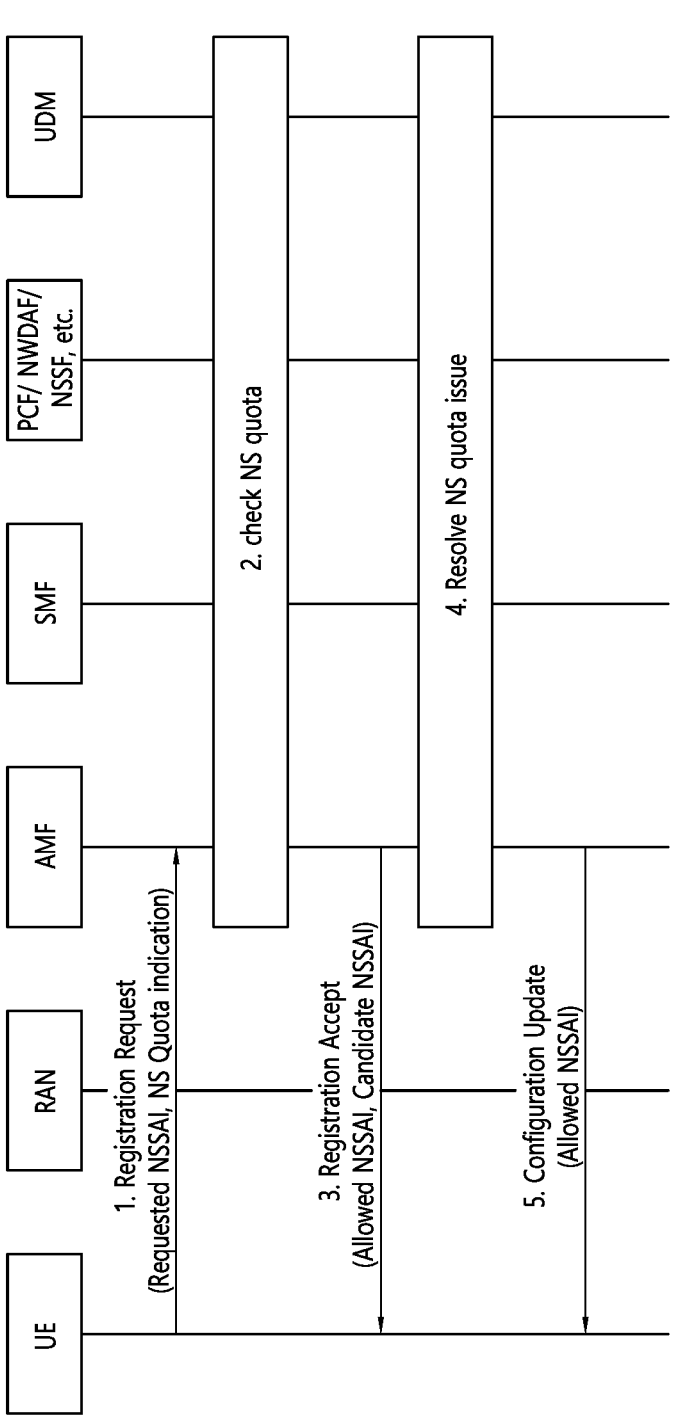
FIG. 11 shows an example of operation of a terminal and a network according to a first example of the disclosure of the present specification.

FIG. 11 shows an example of operation of a terminal and a network according to a first example of the disclosure of the present specification.

1) A terminal (eg, UE) may request an access to the network. For example, the terminal may transmit a registration request message to the AMF. The registration request message may include one or more request information for a network slice. For example, the request information on the network slice may include information on the network slice to which the terminal wants to access (eg, Requested NSSAI). In addition, the UE may transmit information on whether the network slice quota related function is supported or whether the network slice quota related function is activated together with the registration request message. Information on whether to support a network slice quota-related function or whether to activate a network slice quota-related function may be referred to as, for example, NS (Network Slice) Quota indication.

2) The network control node (eg, AMF) may determine whether to apply the network slice quota, based on the operator's policy, subscriber information and/or information on whether to support/activate the quota function transmitted by the terminal (eg, NS Quota indication), For example, the network control node (eg, AMF) may determine network slice permission information and review whether to apply the defined quota. Here, the network slice permission information may be information used to determine whether the terminal can receive a service by accessing the network slice. For example, the network slice permission information may be information monitored by the network control node (eg, AMF) to compare the information with a reference value (eg, a value according to the quota of the network slice) to control whether the terminal can access the network slice. For example, the network slice permission information may vary according to an operator policy, information set in the network, and the like. For example, the network slice permission information may be the number of terminals connected to the network slice, the number of established PDU sessions, and the like. As an example, there may be a network slice in which the maximum number of terminals allowed per network slice must be applied as a quota. For this network slice, the network control node (eg, AMF) exchanges information with other network control nodes (eg, SMF, PCF, NWDAF, NSSF, UDM, new NF, etc.), and may check the number of terminals connected to the corresponding network slice. Here, the new NF may be a newly defined network control node that manages information related to a network slice. In addition, the network control node (eg, AMF) may determine whether to permit the access of the terminal to a specific network slice for which the access is requested from the terminal. A network control node (eg, AMF) may adjust the number of access terminals of a network slice based on a determined quota, and may determine access permission of the terminal accordingly. For example, the network control node (eg, AMF) may reject the access of the terminal when the number of terminals connected to the corresponding network slice is greater than or equal to the quota (eg, the maximum number of terminals allowed). Conversely, the network control node (eg, AMF) may permit access of the terminal when the number of terminals connected to the corresponding network slice is less than the quota (eg, the maximum number of terminals allowed).

3) The network control node (eg, AMF) may transmit a response message to the access request (eg, registration request message) to the terminal. For example, the response message may be a registration acceptance message or a registration rejection message. The response message may include, for example, allowed network slice information (eg, allowed NSSAI) as in the prior art. The response message may additionally or alone include permission candidate network slice information (eg, candidate NSSAI). For example, when the network control node (eg, AMF) rejects the access permission of the terminal based on the determined quota, the network control node (eg, AMF) may transmit permission candidate network slice information to the UE. The response message may include information on one or more of permitted network slice information and/or grant candidate network slice information.

For example, the UE may have transmitted network slice information (eg, Requested NSSAI) indicating that it wants to access two network slices (eg, network slice A and network slice B) to the AMF. The AMF may permit access to network slice A, and may reject access to network slice B due to quota (eg, the maximum number of terminals). In this case, the AMF may transmit a response message (eg, a registration acceptance message or a registration rejection message) including allowed NSSAI information including information on network slice A and Candidate NSSAI information including information on network slice B to the terminal.

Here, the permission candidate network slice may be defined as in the following example. Due to the limitation of the network slice quota, a network node (eg, AMF) may not allow the terminal access to a specific network slice to which the terminal wants to access. In this case, a specific network slice may be defined as a permission candidate network slice. In other words, in addition to the network slice permission procedure confirmed in the prior art, such as subscriber information, the grant candidate network slice may mean a network slice in the case where a network node (eg, AMF) cannot permit access of a UE due to quota restrictions.

A network control node (eg, AMF) may store and maintain the network slice information provided to the UE.

4) As the network situation changes, the quota issue of the network slice can be resolved. For example, in a situation in which the number of access terminals less than the quota of a specific network slice (eg, the maximum number of terminals accessing the network slice) is maintained after a certain period of time, the quota issue of the network slice may be resolved. As another example, the network slice quota issue may be solved by performing an operation for actively maintaining the number of access terminals of the network slice to be less than the quota. For example, the network (eg, a network control node such as AMF) releases any specific terminal connected to the network slice, thereby actively maintaining the number of access terminals in the network slice less than the quota.

5) The network control node (eg, AMF) may update network slice information for a network slice that can be changed to allowed (granted) network slices (eg, network slices related to allowed NSSAI) among permission candidate network slices (eg, network slices related to candidate NSSAI). In addition, the network control node (eg, AMF) may transmit permission network slice information to the terminal. For example, network slice B may be a candidate network slice for permission due to quota. When the quota issue related to network slice B may be resolved, the network control node (eg, AMF) updates network slice information by including information related to network slice B in allowed network slice (eg, network slice related to allowed NSSAI) information. And, the network control node (eg, AMF) may transmit the updated network slice information to the terminal.

2. Second Example of the Disclosure of the Present Specification

Figure 12:
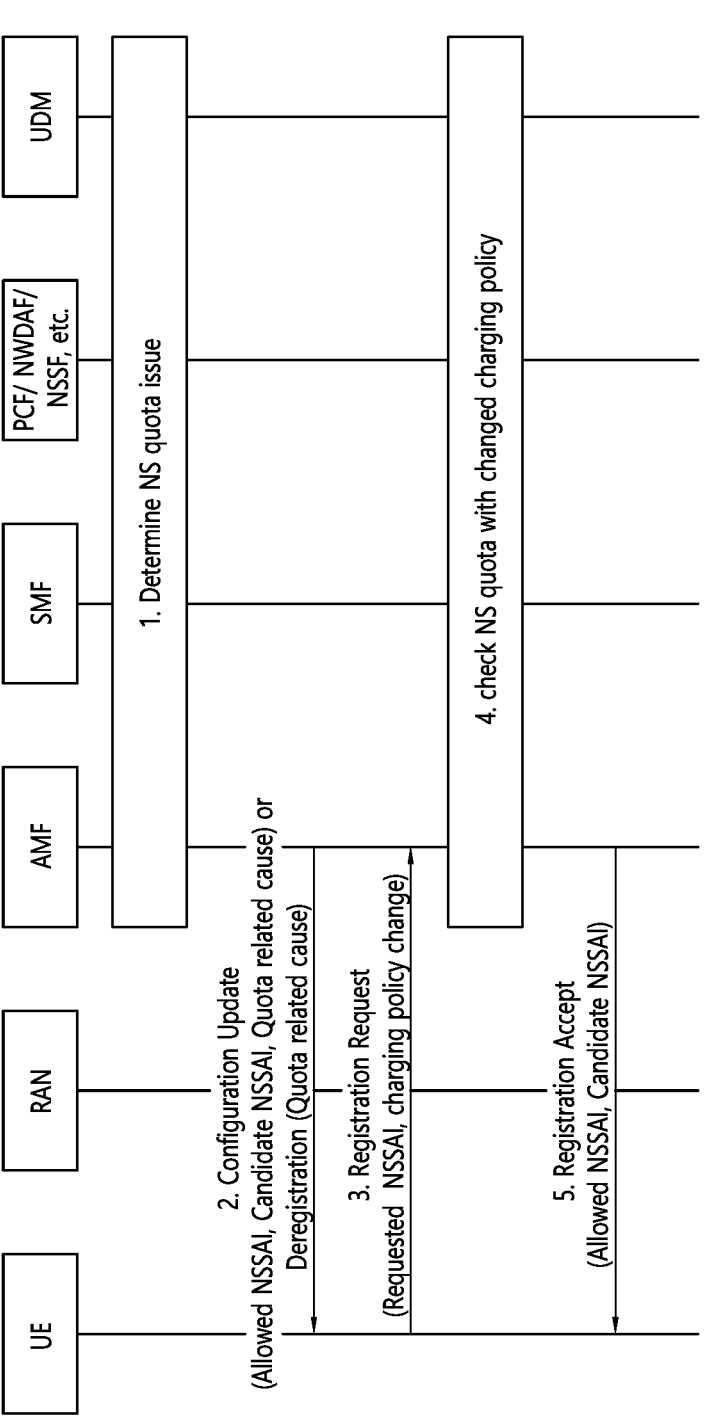
FIG. 12 shows an example of operation of a terminal and a network according to a second example of the disclosure of the present specification.

Hereinafter, a second example of the disclosure of the present specification will be specifically described with reference to FIG. 12.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 12 Shows an Example of Operation of a Terminal and a Network According to a Second Example of the Disclosure of the Present Specification.

1) The network (eg, AMF, SMF, PCF, NWDAF, NSSF, UDM, new NF, etc.) may determine that there is a quota issue for a specific network slice. For example, network control nodes such as AMF, SMF, PCF, NWDAF, NSSF, UDM, new NF, etc, may determine that there is a quota issue through independent determination of one network control node, or may determine that there is a quota issue through information exchange between two or more network control nodes. For example, when the network control node (eg, AMF) reaches the maximum value (eg, the maximum value according to Quota), the number of terminals accessible to a specific network slice, it is no longer possible to receive an access request from the terminal for the corresponding network slice.

2) The network control node (eg, AMF) may select a terminal to suspend access for a while, based on the operator's policy, subscriber information, and/or information transmitted in advance by the terminal (eg, quota function support/activation information (eg NS Quota indication)). Here, the terminal to temporarily suspend access may mean a terminal to temporarily suspend access to a network slice in which the quota issue has occurred. The network control node (eg, AMF) may update allowed network slice information (eg, allowed NSSAI) of the selected terminal. The network control node (eg, AMF) may transmit a configuration update message to the selected terminal. Additionally, the network control node (eg, AMF) may transmit the configuration update message by including the network slice information to block access (eg, information on the network slice in which the connection of the selected terminal will be temporarily suspended) to block access to the candidate network slice information (eg, candidate NSSAI). Additionally, the network control node (eg, AMF) may directly/indirectly inform that the update of the corresponding network slice information (eg, the update of the permitted network slice information and/or the update of the candidate network slice information) is performed in relation to the network slice quota. For example, the network control node (eg, AMF) may include information related to quota (eg, quota related cause) in the configuration update message, and may inform directly/indirectly that the update of the corresponding network slice information is performed in relation to the network slice quota. If, for all network slices permitted for the selected terminal, the access right of the terminal is lost (eg, when a quota issue occurs for all network slices), if authorization is to be withheld, the network control node (eg, AMF) may send a disconnection message (eg, deregistration message) of the network. The connection release message (eg, deregistration message) may include information related to quota (eg, quota related cause).

3) The terminal may transmit a network access request message (eg, a registration request message) to a network control node (eg, AMF). For example, the terminal may be input information requesting to re-evaluate the permission of the network slice related to the quota from the user. Specifically, the user may input an active request to the terminal, such as paying an additional fee (or charging) to re-evaluate the permission of the network slice related to Qouta. In this case, the terminal transmits a network access request message (eg, a registration request message) to the network control node (eg, AMF), thus the terminal may request to re-evaluate the authorization of the network slice associated with the quota. In this case, the terminal sends a network access request message (eg, a registration request message) including information requesting re-evaluation of the permission of the network slice related to the network slice quota (eg, information such as a change in charging of the terminal) to the network control node (eg, AMF). Here, information such as a change in charging of the terminal may be referred to as charging policy change information.

In general, the terminal in order to reduce the signaling load to the network, for the network slice included in the rejected network slice information (eg, rejected NSSAI information) or permission candidate network slice information (eg, candidate NSSAI information), the terminal may not request to reconnect. However, in this case (eg: when there is an active request from the user), the terminal may also request access to the network slice included in the permission candidate network slice information (eg, candidate NSSAI information).

4) The network control node (eg AMF) can apply the changed policy and re-evaluate user access permission.

For example, UE 1 may transmit information to pay an additional fee for network slice A to a network control node (eg, AMF) in step 3). Then, the network control node (eg, AMF) may release the connection to the network slice A of the terminal 2 paying a fee less than the fee paid by the terminal 1 among other terminals connected to the network slice A. Then, since the number of terminals connected to the network slice A is less than or equal to the Quota (the maximum number of terminals), a network control node (eg, AMF) may allow UE 1 to access network slice A.

As another example, UE 1 may transmit information to pay an additional fee for network slice A to a network control node (eg, AMF) in step 3). Then, the network control node (eg, AMF) changes the quota applied to the network slice A, UE 1 may be permitted to access network slice A. For example, the network control node (eg, AMF) changes the maximum number of access terminals of the network slice A from 100 to 101, then the network control node (eg, AMF) may allow the UE 1 to access network slice A.

Alternatively, the network situation may change, and the quota issue of the network slice may be resolved. For example, in a situation in which the number of access terminals less than the quota of a specific network slice (eg, the maximum number of terminals accessing the network slice) is maintained after a certain period of time, the quota issue of the network slice may be resolved. As another example, by performing an operation for the network to actively maintain the number of access terminals of the network slice to be less than the quota, the quota issue of network slices may be resolved. For example, by releasing any specific terminal connected to the network slice by the network (eg, a network control node such as AMF), the number of access terminals of the network slice may be actively maintained to be less than the quota.

5) The network control node (eg, AMF) may update network slice information for a network slice that can be changed to allowed (granted) network slices (eg, network slices related to allowed NSSAI) among permission candidate network slices (eg, network slices related to candidate NSSAI). In addition, the network control node (eg, AMF) may transmit permission network slice information to the terminal. For example, network slice B may be a candidate network slice for permission due to quota. When the quota issue related to network slice B may be resolved, the network control node (eg, AMF) updates network slice information by including information related to network slice B in allowed network slice (eg, network slice related to allowed NSSAI) information. And, the network control node (eg, AMF) may transmit the updated network slice information to the terminal.

Figure 13:
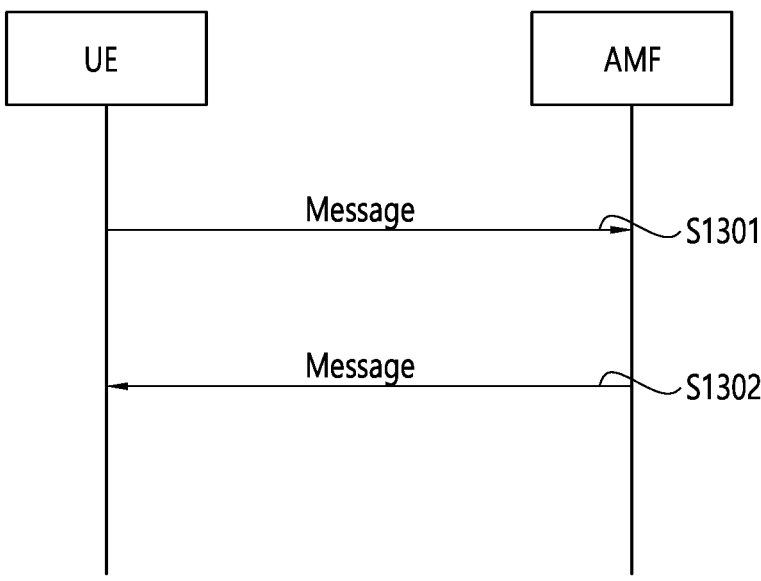
FIG. 13 shows an example of operations of a terminal and a network node according to the disclosure of the present specification.

Hereinafter, with reference to FIG. 13, examples of operations of the terminal (eg, UE) and the network node described in various examples of the present specification (eg, the first example and/or the second example of the disclosure of the present specification) will be described. For reference, the content shown in FIG. 13 is only an example, and the scope of the disclosure of the present specification is not limited by FIG. 13. In the disclosure of this specification, a terminal (eg, UE) and a network node may perform the operations described in various examples of this specification above.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 13 Shows an Example of Operations of a Terminal and a Network Node According to the Disclosure of the Present Specification.

Referring to the example of FIG. 13, a UE and an AMF are shown. In FIG. 13, RAN (not shown) and other network nodes (eg, SMF, PCF, NWDAF, NSSF, UDM, new NF, etc.) are omitted for convenience of description.

For reference, step S1302 may be performed after step S1301 is performed, or step S1301 may be performed after step S1302 is performed.

In step S1301, the UE may transmit a message to the AMF.

The message that the UE transmits to the AMF may be a registration request message. The registration request message may include information on a network slice to which the UE wants to access (eg, a first network slice).

A message transmitted by the UE to the AMF may include information on whether the UE supports a function related to the network slice quota or whether the function related to the network slice quota is activated. Here, the network slice quota may mean, for example, the maximum number of terminals capable of accessing the network slice or the maximum number of PDU sessions that can be connected to the network slice.

After receiving the message from the UE, the AMF may determine whether the UE can access the network slice based on a quota applied to the network slice.

The AMF may determine whether a quota is applied to a network slice. For example, the AMF may perform the operation of step 2) described above with reference to the example of FIG. 12 and/or the operation of step 1) described with reference to the example of FIG. 13.

In step S1302, the AMF may send a message to the UE.

The message transmitted by the AMF to the UE may be a response message to the message transmitted by the UE. If the AMF determines that the UE cannot access the network slice due to the quota applied to the network slice, the message may include candidate network slice information. The candidate network slice information may include information that a network slice to which the UE intends to access is a candidate network slice.

AMF may perform a step of determining whether restrictions related to quotas applied to network slices have been resolved. For example, the AMF may perform the operation of step 4) described above with reference to the example of FIG. 12 and/or the operation of step 1) or step 4) described with reference to the example of FIG. 13.

When the restriction related to the quota applied to the network slice to which the UE wants to access is resolved, the AMF may transmit allowed network slice information including information on this network slice to the UE. For example, the AMF may perform the operation of step 5) described above with reference to the example of FIG. 12 and/or the operation of step 5) described with reference to the example of FIG. 13.

When the AMF transmits the candidate network slice information to the UE, the UE may transmit to the AMF a message requesting access of the UE to the candidate network slice to the AMF. This message may be, for example, a registration request message. This message may include information that a policy (eg, charging information) for a candidate network slice has been changed. For example, the UE may transmit information requesting re-evaluation of the permission of the network slice related to the network slice quota (eg, information such as a change in charging of the UE) to the AMF. For example, the UE may perform the operation of step 3) described with reference to the example of FIG. 13 described above with reference to the example of FIG. 12.

The AMF may re-determine from the UE whether the UE can connect to the first network slice. For example, the AMF may perform the operations of steps 4) and 5) described with reference to the example of FIG. 13 described above with reference to the example of FIG. 12.

According to the disclosure of the present specification described above through various examples, communication related to a network slice can be effectively performed. For example, the network can provide 5G industries/services to the UE more flexibly by using the permission candidate network slice.

According to the disclosure of the present specification, for example, the following operations may be performed.

For example, the network control node (eg, AMF) may receive the access request of the terminal. The network control node (eg, AMF) may determine whether to allow the access of the terminal according to the network slice quota management index (eg, the maximum number of terminals connected to the network slice, the maximum number of PDU sessions, etc.). The network control node (eg, AMF) may transmit a response message to the terminal's access request to the terminal. Here, the response message may include, for example, permission candidate network slice information. In order to suspend the access of a specific terminal connected to a specific network slice, the network control node (eg, AMF) may update the allowed slice information and the grant candidate slice information, and may transmit the updated network slice information to the terminal. The message (e.g. messages containing updated network slice information) transmitted by the network control node (eg, AMF) to the UE may include information indicating directly or/indirectly that the update of the corresponding network slice information has occurred in relation to the network slice quota.

For example, the terminal may transmit an access request (or connection request) message (eg, a registration request message) to a network control node (eg, AMF). The access request message may include, for example, information on whether a network slice quota-related function is supported or information on whether a network slice quota-related function is activated. In addition, the access request message may include information requesting re-evaluation of the permission of the network slice related to the network slice quota (eg, information such as a change in charging of the terminal).

For reference, the operation of the terminal (eg, UE) described in this specification may be implemented by the apparatus of FIGS. 1 to 3 described above. For example, the terminal (eg, UE) may be the first device 100 or the second device 200 of FIG. 1. For example, an operation of a terminal (eg, UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (eg, UE) described herein by executing instructions/programs stored in one or more memories 104 or 204.

In addition, instructions for performing an operation of a terminal (eg, UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, UE) described in the disclosure of the present specification.

For reference, the operation of a network node (eg, AMF, SMF, UPF, PCF, NWDAF, NSSF, UDM, new NF, etc.) or base station (eg, NG-RAN, gNB, gNB(NB-IoT), gNB(NR) eNB, RAN, etc.) described herein may be implemented by the apparatus of FIGS. 1 to 3 to be described below. For example, a network node or a base station may be the first device 100a of FIG. 1 or the second device 100b of FIG. 1. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:
receiving, by an access mobility management node, a first registration request message from a user equipment (UE),
wherein the first registration request message includes requested network slice information which corresponds to one or more network slices with which the UE intends to register; and
transmitting, by the access mobility management node, a registration accept message to the UE,
wherein the registration accept message includes allowed network slice information,
wherein the first registration request message includes network slice quota information related to support of a network slice quota function,
wherein the method further comprises:
i) determining, by the access mobility management node, that the network slice quota function is applied based on the network slice quota information;
ii) determining, by the access mobility management node, a network slice quota by exchanging information with a network slice quota management node,
wherein the registration accept message further includes allowed candidate network slice information based on the UE not being able to access a first network slice due to the network slice quota applied to the first network slice,
wherein the allowed candidate network slice information the first network slice;
iii) determining, by the access mobility management node, whether the network slice quota applied to the first network slice has been resolved; and
iv) transmitting, by the access mobility management node, updated allowed network slice information including the first network slice to the UE, based on the network slice quota applied to the first network slice being resolved,
wherein the UE is allowed to access the first network slice based on the updated allowed network slice information.

2. The method of claim 1,
wherein the network slice quota applied to the first network slice is a maximum number of UEs that can access the first network slice.

3. The method of claim 2,
when the number of UEs connected to the first network slice is equal to or greater than the maximum number, it is determined that the UE cannot access the first network slice due to the network slice quota applied to the first network slice.

4. The method of claim 1, further comprising:
receiving a second registration request message requesting access to the first network slice from the UE.

5. The method of claim 4,
wherein the second registration request message includes information indicating that the policy for the allowed candidate network slice has been changed.

6. The method of claim 4,
based on the second registration request message being received, re-determining whether the UE can access the first network slice.

7. An access management node comprising:
at least one processor; and
at least one memory for storing instructions and operably electrically connectable with the at least one processor;
wherein the operations performed based on execution of the instructions by the at least one processor include:
receiving a first registration request message from a user equipment (UE),
wherein the first registration request message includes requested network slice information which corresponds to one or more network slices with which the UE intends to register; and
transmitting a registration accept message to the UE,
wherein the registration accept message includes allowed network slice information,
wherein the first registration request message includes network slice quota information related to support of a network slice quota function,
wherein the operations further comprise:
i) determining that the network slice quota function is applied based on the network slice quota information;
ii) determining a network slice quota by exchanging information with a network slice quota management node,
wherein the registration accept message further includes allowed candidate network slice information based on the UE not being able to access a first network slice due to the network slice quota applied to the first network slice, wherein the allowed candidate network slice information includes the first network slice;

iii) determining whether the network slice quota applied to the first network slice has been resolved; and iv) transmitting updated allowed network slice information including the first network slice to the UE, based on the network slice quota applied to the first network slice being resolved, wherein the UE is allowed to access the first network slice based on the updated allowed network slice information.

8. A method comprising:

transmitting, by a user equipment (UE), a first registration request message to an access management node, wherein the first registration request message includes requested network slice information which corresponds to one or more network slices with which the UE intends to register;

receiving, by the UE, a registration accept message from the access management node, wherein the registration accept message includes allowed network slice information, wherein the first registration request message includes network slice quota information related to support of a network slice quota function, wherein it is determined that the network slice quota function is applied based on the network slice quota information, wherein the registration accept message further includes allowed candidate network slice information based on the UE not being able to access a first network slice due to a network slice quota applied to the first network slice, and wherein the allowed candidate network slice information includes the first network slice; and receiving, by the UE, updated allowed network slice information including the first network slice from the access management node, based on the network slice quota applied to the first network slice being resolved, wherein the UE is allowed to access the first network slice based on the updated allowed network slice information.

9. The method of claim 8, wherein the network slice quota applied to the first network slice is a maximum number of UEs that can access the first network slice.

10. The method of claim 8, further comprising:

transmitting a second registration request message for requesting access to the first network slice, which is a candidate network slice, to the access management node, wherein the second registration request message includes information indicating that the policy for the allowed candidate network slice has been changed.

11. The method of claim 8, further comprising:

based on the allowed candidate network slice information, displaying information indicating that the first network slice cannot be accessed on a display of the UE.

12. The method of claim 8, wherein the allowed candidate network slice information includes waiting time information, and wherein information indicating waiting time based on the waiting time information is displayed together with information indicating that the first network slice cannot be accessed.

* * * * *